United States Patent [19]

Bellegarda et al.

[11] Patent Number: 5,644,652
[45] Date of Patent: Jul. 1, 1997

US005644652A

[54] SYSTEM AND METHOD FOR AUTOMATIC HANDWRITING RECOGNITION WITH A WRITER-INDEPENDENT CHIROGRAPHIC LABEL ALPHABET

[75] Inventors: Eveline Jeannine Bellegarda; Jerome Rene Bellegarda, both of Goldens Bridge; David Nahamoo, White Plains; Krishna Sundaram Nathan, New York, all of N.Y.

[73] Assignee: International Business Machines Corporation, Armonk, N.Y.

[21] Appl. No.: 424,236

[22] Filed: Apr. 19, 1995

Related U.S. Application Data

[63] Continuation of Ser. No. 156,335, Nov. 23, 1993, abandoned.

[51] Int. Cl.$^6$ ............................................. G06K 9/18
[52] U.S. Cl. ........................... 382/186; 382/187; 382/228
[58] Field of Search .................................. 382/224–228, 382/186–187; 381/41–43

[56] References Cited

U.S. PATENT DOCUMENTS

| | | | |
|---|---|---|---|
| 4,491,960 | 1/1985 | Brown | 382/37 |
| 4,525,860 | 7/1985 | Boivie | 382/21 |
| 4,653,107 | 3/1987 | Shojima et al. | 382/13 |
| 4,718,103 | 1/1988 | Shojima et al. | 382/13 |
| 4,731,857 | 3/1988 | Tappert | 382/9 |
| 5,005,205 | 4/1991 | Ellozy et al. | 382/3 |
| 5,023,918 | 6/1991 | Lipscomb | 382/24 |
| 5,038,382 | 8/1991 | Lipscomb | 382/13 |
| 5,075,896 | 12/1991 | Wilcox et al. | 382/225 |
| 5,199,077 | 3/1993 | Wilcox et al. | 381/43 |
| 5,343,537 | 8/1994 | Bellegarda et al. | 382/13 |
| 5,392,363 | 2/1995 | Fujisaki et al. | 382/228 |
| 5,459,809 | 10/1995 | Kim et al. | 382/228 |

OTHER PUBLICATIONS

"Symbol Recognition System By Elastic Matching", J.M. Kurtzberg et al., IBM Technical Disc. Bulletin, vol. 24, No. 6, Nov. 1981.

"Isolated Word–Recognition Method", IBM Technical Disc. Bulletin, vol. 29, No, 4, Sep. 1986.

"Subsampled Prototypes and Weighted Clustering", IBM Technical Disc. Bulletin, vol. 29, No. 8 Jan. 1987.

"Recognition of Handwritten Word: First and Second Order Hidden Markov Model Based Approach", A. Kundu, et al., Pattern Recognition, vol. 22, No. 3, pp. 283–297, 1989.

"Probabilistic Neural Functions of Markov Chains (Neural HMMs)", IBM Technical Disc. Bulletin, vol. 33, No. 7, Dec. 1990.

"Iterative Scheme for the Maximum Mutual Information Training of Hidden Markov Models", IBM Technical Disc. Bulletin, vol. 33, No. 7, Dec. 1990.

"Maximum Mutual Information Training of Hidden Markov Models with Continuous Parameters", IBM Technical Disc. Bulletin, vol. 33, No. 7, Dec. 1990.

*Primary Examiner*—Joseph Mancuso
*Attorney, Agent, or Firm*—Perman & Green, LLP

[57] ABSTRACT

An automatic handwriting recognition system wherein each written (chirographic) manifestation of each character is represented by a statistical model (called a hidden Markov model). The system implements a method which entails sampling a pool of independent writers and deriving a hidden Markov model for each particular character (allograph) which is independent of a particular writer. The HMMs are used to derive a chirographic label alphabet which is independent of each writer. This is accomplished during what is described as the training phase of the system. The alphabet is constructed using supervised techniques. That is, the alphabet is constructed using information learned in the training phase to adjust the result according to a statistical algorithm (such as a Viterbi alignment) to arrive at a cost efficient recognition tool. Once such an alphabet is constructed a new set of HMMs can be defined which more accurately reflects parameter typing across writers. The system recognizes handwriting by applying an efficient hierarchical decoding strategy which employs a fast match and a detailed match function, thereby making the recognition cost effective.

23 Claims, 12 Drawing Sheets

SYSTEM AND METHOD FOR AUTOMATIC HANDWRITING RECOGNITION WITH A WRITER-INDEPENDENT CHIROGRAPHIC LABEL ALPHABET

This is a continuation of application Ser. No. 08/156,335 filed on Nov. 23, 1993, now abandoned.

FIELD OF THE INVENTION

This invention is in the field of signal processing, and specifically is directed to systems and methods for the handwriting recognition of a plurality of independent writers.

BACKGROUND OF THE INVENTION

Automatic systems purporting to recognize cursive script writing, or even handwritten characters, have so far met with only limited success. The reason for this limited success can be traced largely to the lack of robustness exhibited by the templates used in the modeling of handwriting. For example, reference is made to U.S. Pat. No. 4,731,857 to Tappert which describes an elastic matching approach for the recognition of run-on handwritten characters.

Tappert teaches three steps. First, potential segmentation points are derived. Second, all combinations of the segments that could reasonably be a character are sent to a character recognizer to obtain ranked choices and corresponding scores. Third, the character sequences are combined so that the best candidate word wins.

Tappert's recognition algorithm itself is a template matching algorithm based on dynamic programming. Each template is a fully formed character presumably representative of the writer's average way of forming this character, and the elastic matching scores of the current character are computed for each template. This strategy is vulnerable to the extensive variability that can be observed both across writers and across time.

In an article entitled "Design of a Neural Network Character Recognizer for a Touch Terminal" by Guyon et al, *Pattern Recognition*, a neural network is employed to classify and thereby recognize input characters. This results in a relatively robust algorithm but requires a large amount of data and is expensive to train.

A prior patent application entitled, "A Statistical Mixture Approach To Automatic Handwriting Recognition," filed by Bellegarda et al., on Oct. 31, 1991, (Ser. No. 07/785,642) now U.S. Pat. No. 5,343,537, issued Aug. 30, 1994, is directed to a fast algorithm for handwriting recognition having an acceptable degree of robustness. Bellegarda's prior application entails at least three considerations: (i) the feature elements should be chosen such as to characterize handwriting produced in a discrete, run-on, cursive, or unconstrained mode equally well; (ii) these feature elements should be suitably processed so as to minimize redundancy and thereby maximize the information represented on a per-parameter basis; and (iii) the resulting feature parameters should be further analyzed to detect broad trends in handwriting and enable appropriate modeling of these trends. These considerations are not met by the elastic matching approach taught by Tappert, since (i) it is character-based, and (ii) it simply averages several instances of a character to obtain a character template.

According to U.S. Pat. No. 5,343,537, the signal processing front-end is a great deal more sophisticated than that of elastic matching. Rather than merely chopping the input data into segments, the signal is transformed onto a higher dimensional feature space (chirographic space), whose points represent all raw observations after non-redundant feature extraction. Using a Gaussian (as opposed to a Euclidean) measure for a more refined clustering, the prototypes in this space are formed for robustness purposes. Hence, each prototype represents a small building block which may appear in many characters. Instead of character sequences, building block sequences are combined, each of which is assigned a true likelihood defined on a bona fide probability space (as opposed to just a distance score). Finally, the recognition algorithm itself is a maximum a posteriori (i.e. empirical) decoder operating on this probability space. The formulation described in Bellegarda's prior application may be alternatively cast in terms of multi-arc, single state, hidden Markov models (HMMs). This formulation, while being robust, may not adequately model the intra-character variation of the alphabet.

A second patent application entitled, "A Continuous Parameter Hidden Markov Model Approach to Automatic Handwriting Recognition", filed by J. Bellegarda et al., on Jan. 8, 1992, (Ser. No. 07/818,193) is directed to a computer implemented system and method for recognizing handwriting. This second application of Bellegarda et al. also entails at least three considerations: (i) for each character, identifying the different way of writing the character, also referred to as "allographs"; (ii) performing a training phase in order to generate a hidden Markov model (HMM) for each of the allographs; and (iii) performing a decoding phase to recognize handwritten text.

Bellegarda's second application discloses performing the training phase as follows. The system receives sample characters, wherein the sample characters are represented by training observation sequences. The system sorts the sample characters according to the allographs by mapping the sample characters onto a representational space, referred to as a lexographic space, to find high-level variations in the sample characters. It should be noted that the lexographic space is only marginally related to chirographic space. Specifically, the chirographic space is populated by frame-level feature vectors (i.e. the handwriting is chopped into small sub-character sections or "frames" and then vectors which mathematically represent the "frames" are created), while the lexographic space contains only character level feature vectors (i.e. the handwriting is chopped into whole characters and then vectors which mathematically represent the characters are created). As a result the lexographic space is more appropriate for finding the high level variations for characterizing allographs. This characterizing of allographs during training allows the system to create HMMs that mathematically represent each of the different ways an individual may write the same character (e.g. the letter "a" may look totally different depending on who is doing the writing and other variable factors). Once these models are generated they may be used for recognizing handwriting mapped into chirographic space. Accordingly, for each of the allographs, the system generates sequences of feature vectors for the sample characters associated with respective allographs by mapping in chirographic space. Next, the system generates a HMM for each of the allographs. The HMMs are generated by initializing model parameters and then updating the model parameters.

The system initializes the model parameters as follows. The system sets a length for each of the HMMs based on the average length of the sequences of feature vectors obtained for each allograph. Then, the system initializes state transition probabilities of the HMMs to be uniform. Next, the system assigns an output probabability distribution (for example, a mixture of Gaussian density distributions) to each of the states.

Bellegarda's second application discloses updating the model parameters by performing Viterbi alignment of the observation sequences in order to update the model parameters (that is, the output distributions, mixture coefficients, and state transition probabilities). The Viterbi algorithm is generally described in F. Jelinek, "The Development of an Experimental Discrete Dictation Recognizer", *Proc. IEEE*, Vol. 73, No. 11, Pages 1616–1623 (November 1985).

Finally, Bellegarda's second application discloses performing the decoding phase as follows. The system receives test characters to be decoded (that is, to be recognized). The system generates sequences of feature vectors for the test characters by mapping in chirographic space. For each of the test characters, the system computes probabilities that the test character can be generated by the HMMs. The system decodes the test character as the character associated with the HMM having the greatest probability.

The above approach provides excellent recognition performance for writer-dependent tasks. However, several considerations should be kept in mind when considering writer-independent tasks. First, the chirographic prototypes used in the derivation of the HMM parameters typically vary substantially from writer to writer. Second, parameter tying across different HMMs typically will vary significantly from writer to writer. This means that there is no single label alphabet from which to draw all potential elementary units for all writers, which in turn makes it difficult to (a) compare across writers the HMMs generated for a given character and, (b) to generate a good set of writer-independent HMMs.

A related consideration is that, if insufficient data has been observed for a particular allograph, there is no way to make the parameter estimates more reliable by considering supplemental data from additional writers.

Another consideration is that no supervision is enforced while searching for a partition of chirographic space. Supervision indicates whether or not there is any monitoring of the process of prototype building in the training phase. This is important because, if there is no supervision, then even for a single writer there may be no explicit relationship between a character or allograph model and its manifestation in chirographic space.

A related consideration is that, without supervision, the risk of performing the training phase in an inefficient manner (i.e. not cost-effectively) is high because there is no mechanism to monitor, and therefore adjust, the training activity.

A general problem of prior handwriting recognition systems in the area of cost effectiveness is related to inefficient methods of decoding the handwriting. This is especially critical when the handwriting to be recognized may belong to any one of a number of writers.

OBJECTS OF THIS INVENTION

In view of the foregoing a first object of this invention is to construct an entire alphabet of allograph (character) models which can be used to characterize handwriting obtained from several different writers.

A further object of this invention is to derive allograph (character) models (HMMs) by using supervised (i.e. monitored and adjusted according to some predetermined criteria) techniques where the derived models are independent of any one particular writer.

Another object is to perform the construction of the above referenced alphabet in such a way that the HMM for each allograph is explicitly related to the manner in which the character is physically written (chirographic manifestation).

A still further object is to implement such construction in an efficient way to provide for a cost-effective training phase.

Yet another object is to also make the recognition cost-effective.

SUMMARY OF THE INVENTION

In accordance with the foregoing objects an automatic handwriting recognition system is provided where each written manifestation of each character is represented by a HMM. The system implements a method, which will be described below, for the efficient construction of a supervised, writer independent chirographic label alphabet for handwriting recognition systems using a chirographic HMM for each allograph. The method entails sampling a pool of independent writers, and deriving a statistical model (HMM) for each particular character (allograph) which is independent of a particular writer. The sample data from each writer is then statistically aligned against each associated HMM. This invention thus provides a mechanism to supervise the partition of chirographic space. This supervised information is used to derive a chirographic label alphabet which is independent of each writer. This is accomplished during what is described as the training phase of the system. Once such an alphabet is constructed a new set of HMMs can be defined which more accurately reflects parameter typing across writers. The system recognizes handwriting by applying an efficient hierarchical decoding strategy which employs a fast match and a detailed match function, thereby making the recognition cost effective.

BRIEF DESCRIPTION OF THE DRAWINGS

For an understanding of the invention, reference will be made by way of example to the accompanying drawings in which.

DETAILED DESCRIPTION OF THE INVENTION

Figure 1:
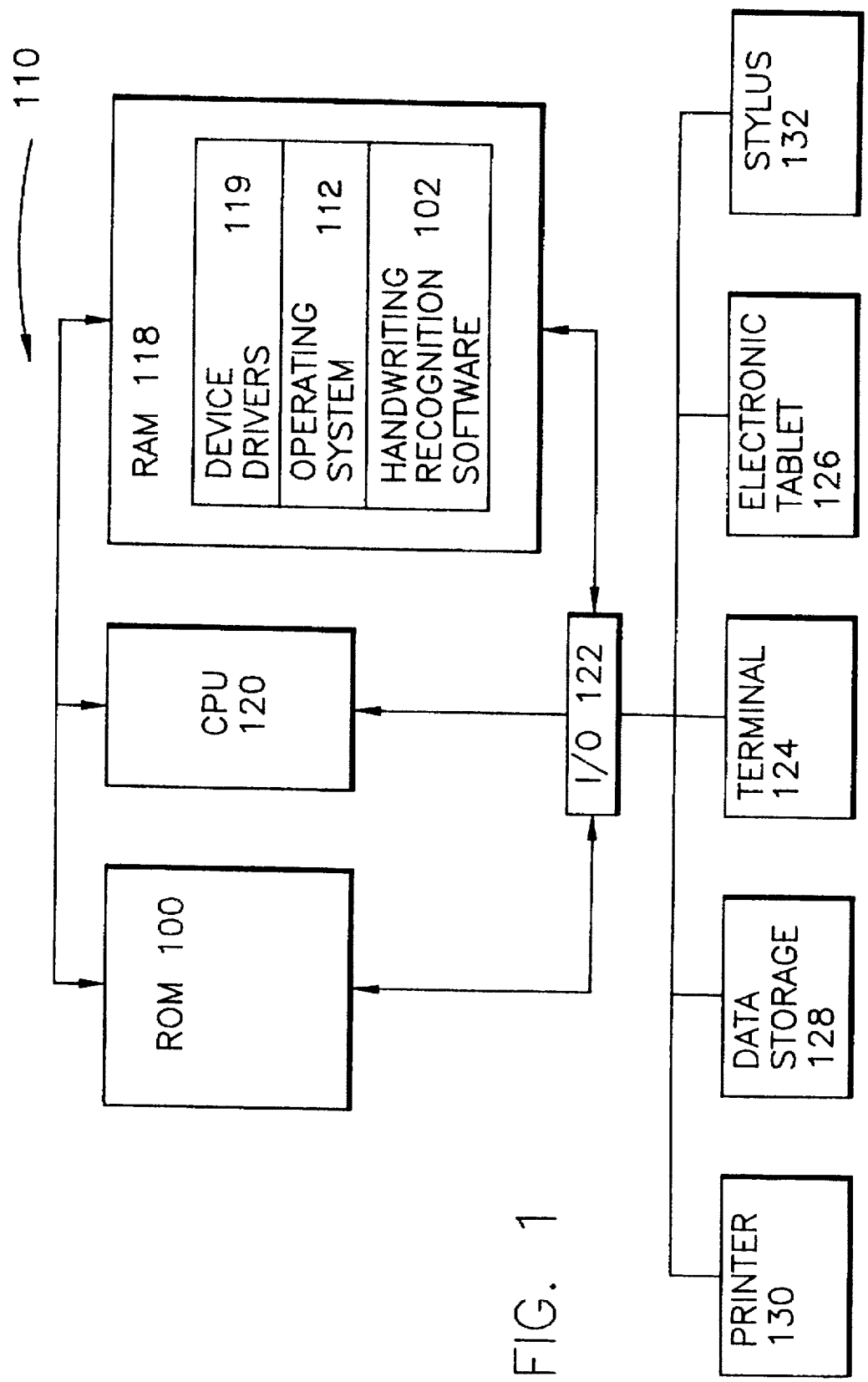
FIG. 1 illustrates an overview of the system which comprises the present invention.

FIG. 1 illustrates an overview of the preferred system which comprises the present invention. The hardware environment includes a computer 110. The computer 110 has hardware elements, random access memory (RAM) 118, read only memory (ROM) 100, a central processing unit (CPU) 120, and an input/output (I/O) interface 122. Loaded into RAM 118 is device driver 119, operating system 112, and handwriting recognition software 102. CPU 120 is interconnected to RAM 118, ROM 100, and I/O 122.

According to a preferred embodiment, the computer 110 may be an IBM ThinkPad™. The preferred operating system 112 is any operating system adapted for use with the IBM ThinkPad.

Connected to the computer 110 are a number of peripherals, such as a terminal 124, an electronic writing tablet 126 (having a stylus 132), a data storage device 128, and a printer 130.

Operating on the computer 110, and loaded into RAM 118, is the handwriting recognition software 102 of the present invention. While the present invention is described herein as a computer system (i.e. a combination of hardware and software),it should be realized that the present invention could be implemented in hardware only. This may in fact be the preferred embodiment for applications where real-time operation is critical.

The computer platform 110 receives character or stroke information produced by a user using the stylus 132 to write on the electronic tablet 126. The character or stroke information may be displayed on the electronic tablet 126 or another display device, such as the terminal 124. The information is received by device driver 119 and passed, in the form of a two dimensional trace, to handwriting recognition software 102 which is residing in RAM 118.

The character or stroke information produced by the user are also called sample characters or observations of characters. The sample characters which the user produces during the training phase are collectively called training data. The sample characters which are produced during the decoding phase are collectively called test, decoding, or recognition data. Both sets of data are received in the Data Capture step 201, shown in FIG. 2.

Figure 2:
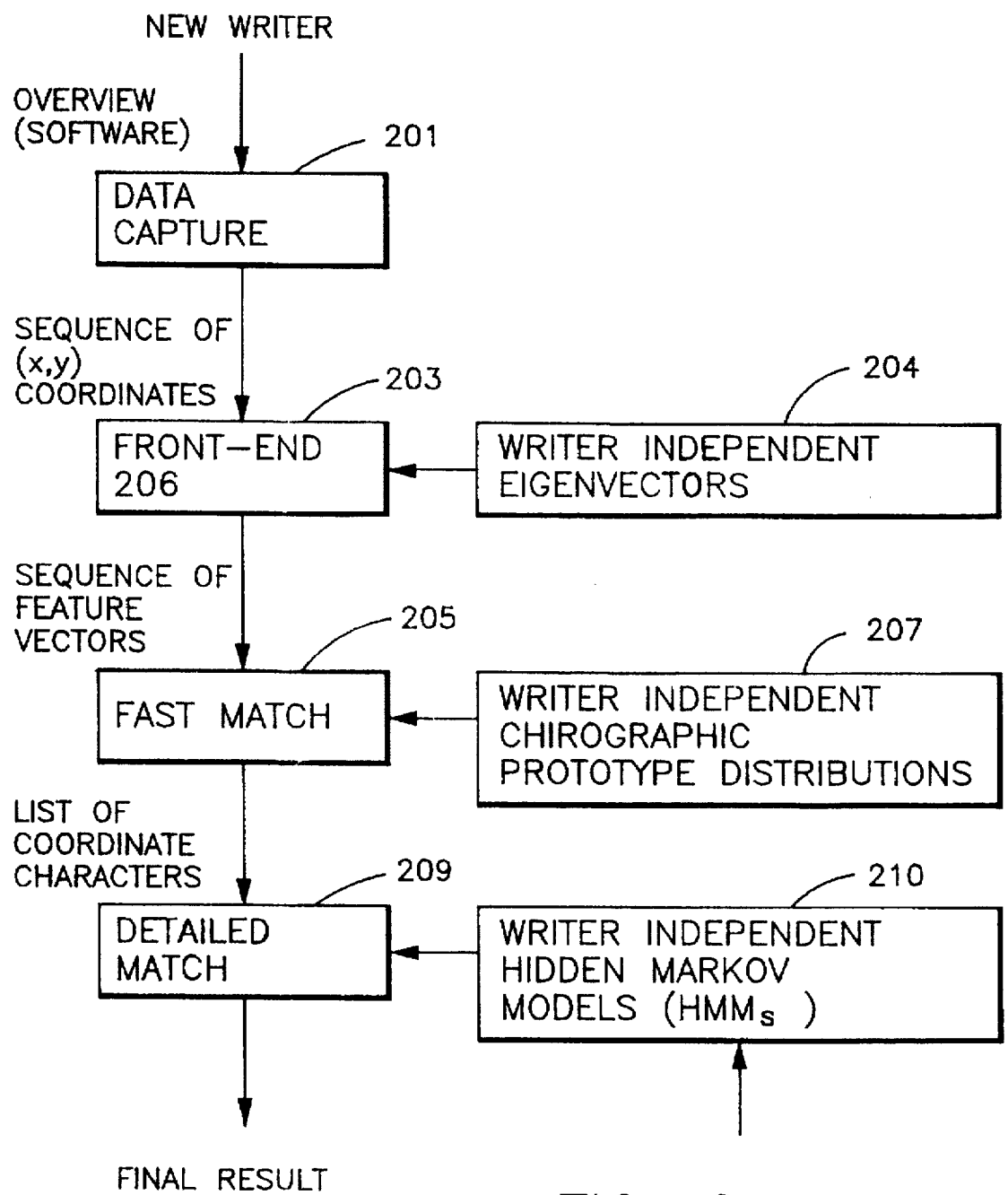
FIG. 2 illustrates a handwriting recognition flowchart which represents the operation of the software portion of the system.

Other steps shown in FIG. 2 complete an overview of handwriting recognition program 102. In step 203, front end 206 generates a sequence of feature vectors for the input handwriting using the two-dimensional trace associated with the input handwriting. During step 203, front end 206 uses a set of eigenvectors 204 to project the data onto a lower dimensional, more orthogonal space, called the chirographic space. Step 205 and 209 are the FAST MATCH and DETAILED MATCH functions that the handwriting recognition program 102 provides.

The FAST MATCH of step 205 allows the system to generate a list of probable candidate characters sequentially using coarse, single-state, HMMs obtained from the writer-independent chirographic prototype distributions 207.

The DETAILED MATCH of step 209 decides which one of the list generated by the fast match position is the most likely using refined, multi-state, writer independent HMMs for each associated allograph. The FAST MATCH function of step 205 is explained in detail in FIG. 5A, below, and the DETAILED MATCH function of step 209 is also explained below in FIG. 5B.

It should be noted that the HMMs obtained during the training phase may not include the writer whose handwriting the system is attempting to recognize. During the training phase, all possible allographs for all characters of interest are identified. For example, the characters of interest may be all upper case characters, all lower case characters, and certain punctuation characters. Allographs represent different styles for writing characters. Different allographs of the same character represent significant differences in writing styles. For example, different allographs may differ in shape, in the direction of pen movement of a stroke, or even in the number of strokes. Different writers will almost certainly have distinctly different styles of writing and thus at least some distinctly different allographs.

Figure 11:
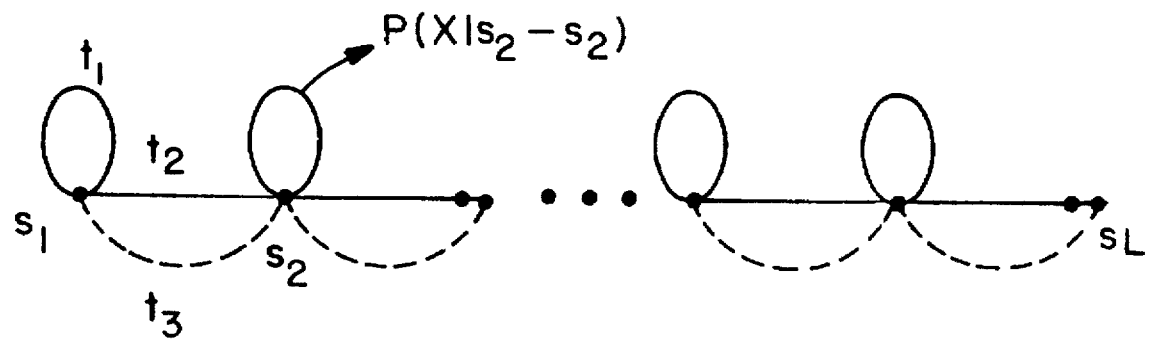
FIG. 11 illustrates an example of a HMM.

The handwriting recognition program 102 represents each allograph in terms of a left-to-right HMM. FIG. 11 illustrates an example of a multi-state HMM. Referring to FIG. 11, the nodes labeled $S_1 \ldots S_i$ represent the states of the HMM. Associated with each state is a set of transitions denoted in FIG. 11 by $t_1$, $t_2$, and $t_3$. These transitions govern the path taken through the sequence of states. The transition labeled $t_1$ and $t_2$ result in the emission of an observation feature vector, while that labeled $t_3$ is a null transition and results in no output. The state transition probabilities, $p(S_i, t_i)$ (which are equivalent to $p(S_i \rightarrow S_i)$ for $t_1$ and $p(S_i \rightarrow S_{i+1})$ otherwise), and the output probability distributions $p(x_i|S_i \rightarrow S_j)$, specify the HMM.

Figure 3:
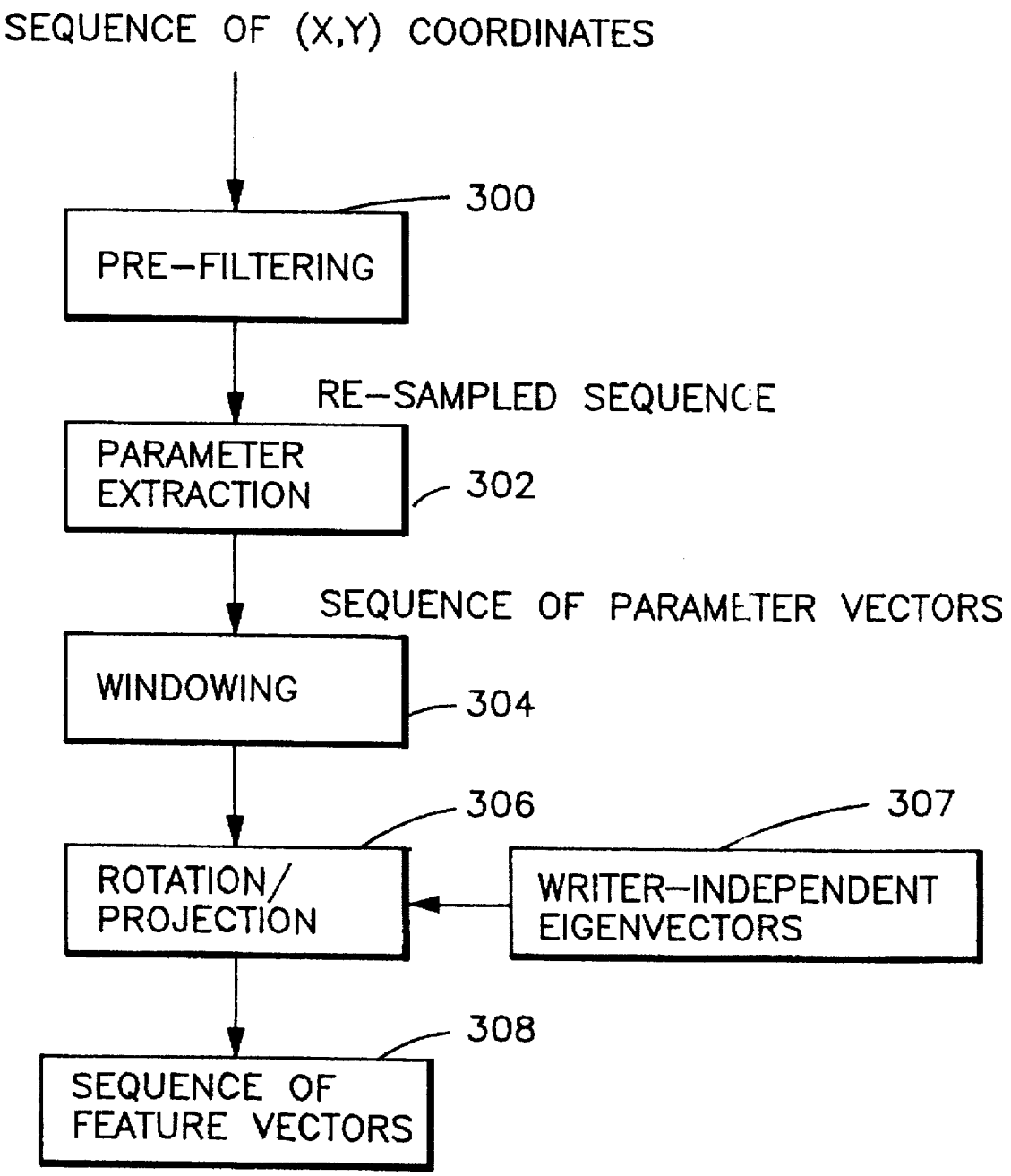
FIG. 3 illustrates a handwriting recognition flowchart which represents the operation of the front-end recognition portion of the present invention.

The operation of front end 206 during step 203 is further described below in the description of FIG. 3. Front end 206 implements the following algorithm while performing step 203.

1. As shown in FIG. 3 at step 300, the front end 206 performs a pre-filtering of the data to normalize for the speed of writing. This is accomplished by converting the time-dependent representation captured by the tablet, where the path of the points is ballistic in nature (i.e. the trace of the path of the pen follows a similar path, when measured in two dimensional space, to that of a projectile in space) into a time-independent representation, where all the points are equally spaced. Linear-interpolation is performed as necessary to find the resulting equally spaced points. The purpose of the interpolation is to find the best fit line to the points, which may not in actuality follow any linear function. If desired, a cubic spline interpolation can also be performed for a more refined interpolation.

2. Parameter extraction as shown in step 302, and is described as follows. For each point $P_n$ of coordinate $(x_n, y_n)$ in the training data, front end 206 forms a P-dimensional vector $P_n$ of feature elements representative of the local pen trajectory around $P_n$. For example, a good choice for P is 6, with feature elements given by: (i) the horizontal and vertical incremental changes: (ii) the sine and cosine of the angle of the tangent to the pen trajectory at $P_n$; and (iii) the incremental changes in the sine and cosine of the angle of the tangent.

Note that the last parameters provide information about the curvature of the pen trajectory at point Pn.

3. The description of parameter extraction, step 302 continues: For each point $P_n$ of coordinates $(x_n, y_n)$ in the training data, the front end 206 forms a P'-dimensional vector $P_n$ of feature elements representative of the global pen trajectory up to $P_n$. For example, a good choice for P' is 3, with feature elements given by: (i) the height from the baseline $y_n$, (ii) the width from the beginning of the stroke $x_n - x_i$, where xi is the first coordinate of the current stroke, and (iii) the inter-stroke distance if the current character is composed of more than one stroke.

4. Once a sequence of parameter vectors are extracted, as described above in step 302, then the windowing step 304 is performed by front end 206. For each stroke in the training data, front end 206 determines a subset of the points $P_n$ in that stroke, say $Q_i$, with the property that the $Q_i$'s are approximately equally spaced. This set should always include the first and last points of each stroke, and the spacing interval should be some reasonable function of the line height.

5. At each location $Q_i$ obtained in step 304, the front end 206 constructs a Q-dimensional spliced vector by concatenating together the H vectors $P_n$ preceding $Q_i$, the vector $q_i$ corresponding to $Q_i$, and the H vectors $P_n$ following $Q_i$. Similarly, front end 206 constructs a Q'-dimensional spliced vector by concatenating together the H' vectors $P'_n$ preceding $Q_i$, the vector $q'_i$ corresponding to $Q_i$ and the H' vectors $P_n$ following $Q_i$. This is realizable provided the following holds: Q=P (2H+1), Q'=P'(2H'+1). Good choices are H=H'=20, yielding values Q=246 and Q'=123.

6. The following step is part of the training phase, rather than the decoding phase. It is included here for the purpose of completing the understanding of the present invention. Front end 206 computes the mean vector and covariance matrix of all the Q-dimensional vectors corresponding to local handwriting features. These are denoted as $M_r^{(1)}$ and $S_r^{(1)}$, respectively. Similarly, front end 206 computes the mean vector and covariance matrix of all the Q'-dimensional vector corresponding to global handwriting features. These are denoted as $M_r^{(2)}$ and $S_r^{(2)}$, respectively.

7. The following step is also part of the training phase, rather than the decoding phase. It is included here for the purpose of completing the understanding of the present invention. For n=1, 2, front end 206 computes $E_r^{(n)}$, the eigenvector matrix of $S_r^{(n)}$, and $\Lambda_r^{(n)}$, the diagonal matrix of corresponding eigenvalues. Note that these quantities obey the relationship: $S_r^{(n)}=E_r^{(n)} \Lambda_r^{(n)} E_r^{(n)}T$, where T denotes matrix transposition. Thus, the leading eigenvectors in $E_r^{(n)}$ correspond to the leading eigenvalues in $\Lambda_r^{(n)}$.

8. Once the windowing step 304 is complete then front end 206 performs the Rotation/Projection step 306. Using the $R_1$ leading eigenvectors from Step 310, the front end 206 projects the Q-dimensional feature vectors of Step 304 onto a space of dimension $R_1$. The resulting vectors are called $r_i^{(1)}$. A reasonable value for $R_1$ is 6. At this point the redundancy present in the Q-dimensional spliced feature vectors has been eliminated by concentrating on the most informative feature elements. The space spanned by the vectors $r_i^{(1)}$ is the chirographic space $C^{(1)}$.

9. Similarly, using the $R_2$ leading eigenvectors from Step 310, the front end 206 projects the Q'-dimensional feature vectors of Step 304 onto a space of dimension $R_2$, with resulting vectors $r_i^{(2)}$. A reasonable value for $R_2$ is 15. Note that $R_2$ is greater than $R_1$ because there is generally less redundancy present in the (global features) Q-dimensional spliced feature vectors than in the (local features) Q-dimensional spliced feature vectors. The space spanned by the vectors $r_i^{(2)}$ is the chirographic space $C^{(2)}$.

The operation of front end 206 is further described in a pending patent application entitled "A Statistical Mixture Approach to Automatic Handwriting Recognition," filed on Oct. 31, 1991 which is herein incorporated by reference in its entirety.

Figure 4:
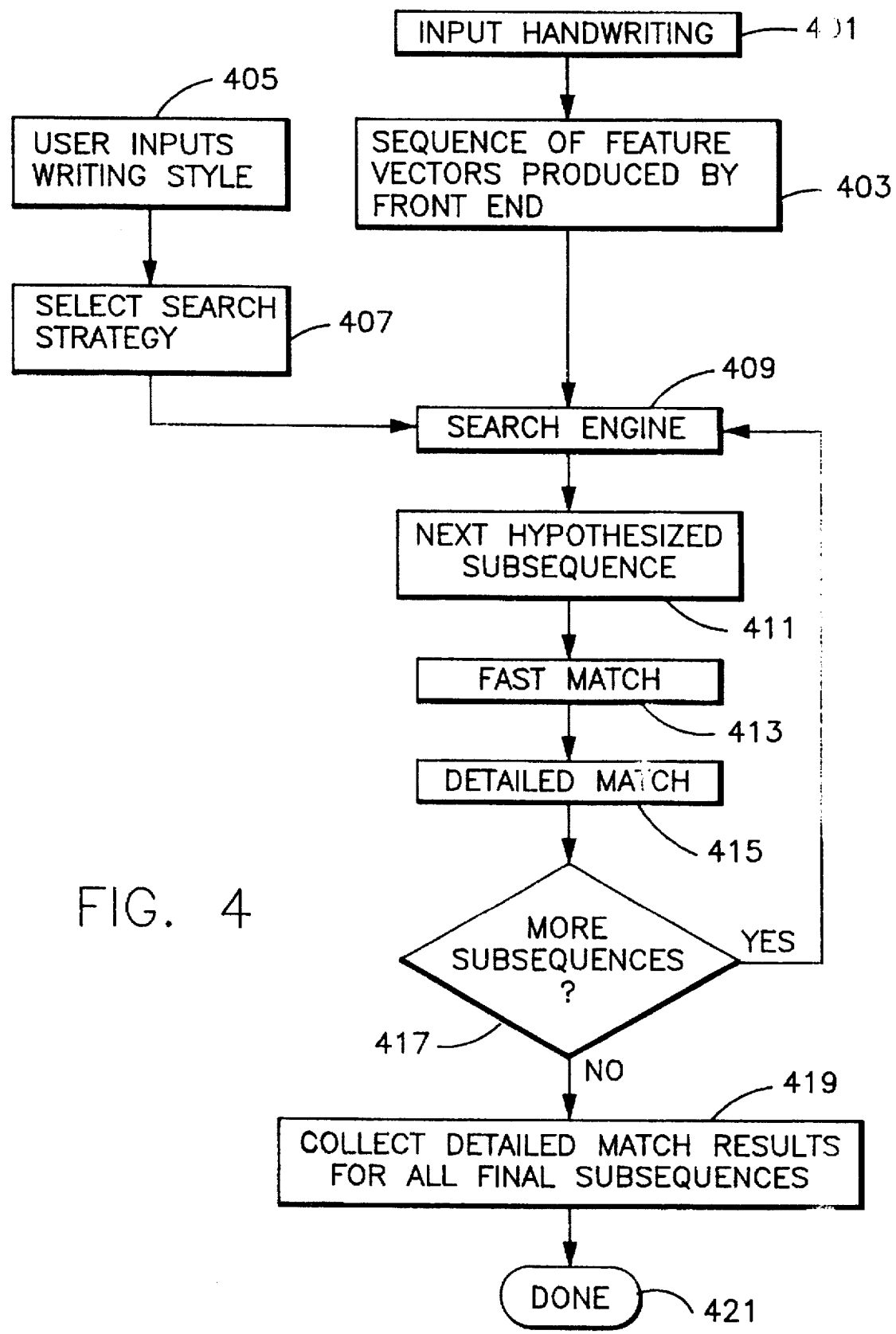
FIG. 4 illustrates an overview of the Decoding phase.

FIG. 4 illustrates a decoding/testing flow chart which represents an overview of the decoding phase.

In step 401, the computer 110 receives the input handwriting which a user enters on the electronic tablet 126 by using the stylus 132. In step 403, front end 206 generates, for each character in the text, a sequence of feature vectors by using the associated two-dimensional trace. The operation of front end 206 during step 504 is described above, with the exception that steps 6 and 7 in the description of front end 206 (above) is not performed (recall #6 and #7 are part of the training phase). The #8 and #9 steps in the description of front end 206 (above) are performed using the eigenvectors generated in the training phase. In step 405, the user selects the writing style (cursive, discrete, etc.) corresponding to the text of the step 401. This information is important to the search engine (step 409).

In step 407, the search strategy is selected on the basis of the information in step 405. In the case of noncursive or discrete writing (i.e. block style characters that are not connected) the search strategy is considerably simplified.

In step 409 the appropriate search engine is invoked. In the case of discrete writing, the sequence of feature vectors for each character is known. Therefore the "search" is limited to this sequence. In other cases, a well-known A* type search algorithm is employed. The A* search algorithm is described in Nilsson, N. J., *Learning Machines*, Ch. 4, McGraw Hill, New York, N.Y., 1965.

For example, a suitable A* search algorithm is described in U.S. Pat. No. 4,731,857 to Tappert, which is herein incorporated by reference in its entirety.

In step 411, the search engine 409 selects a subsequence of feature vectors from the sequence 403. This subsequence serves as an input to the FAST MATCH function 413, to be described in detail below. The output of the FAST MATCH is then passed on to the DETAILED MATCH function 415, also to be described in detail below.

In step 417, the handwriting recognition program 102 determines whether there are any more subsequences to process. If there are no more subsequences to process, then the decoding phase is complete. Otherwise, the handwriting recognition software 102 loops back to step 409. The results for all final subsequences are collected in step 419, completing the recognition process.

Figure 5A:
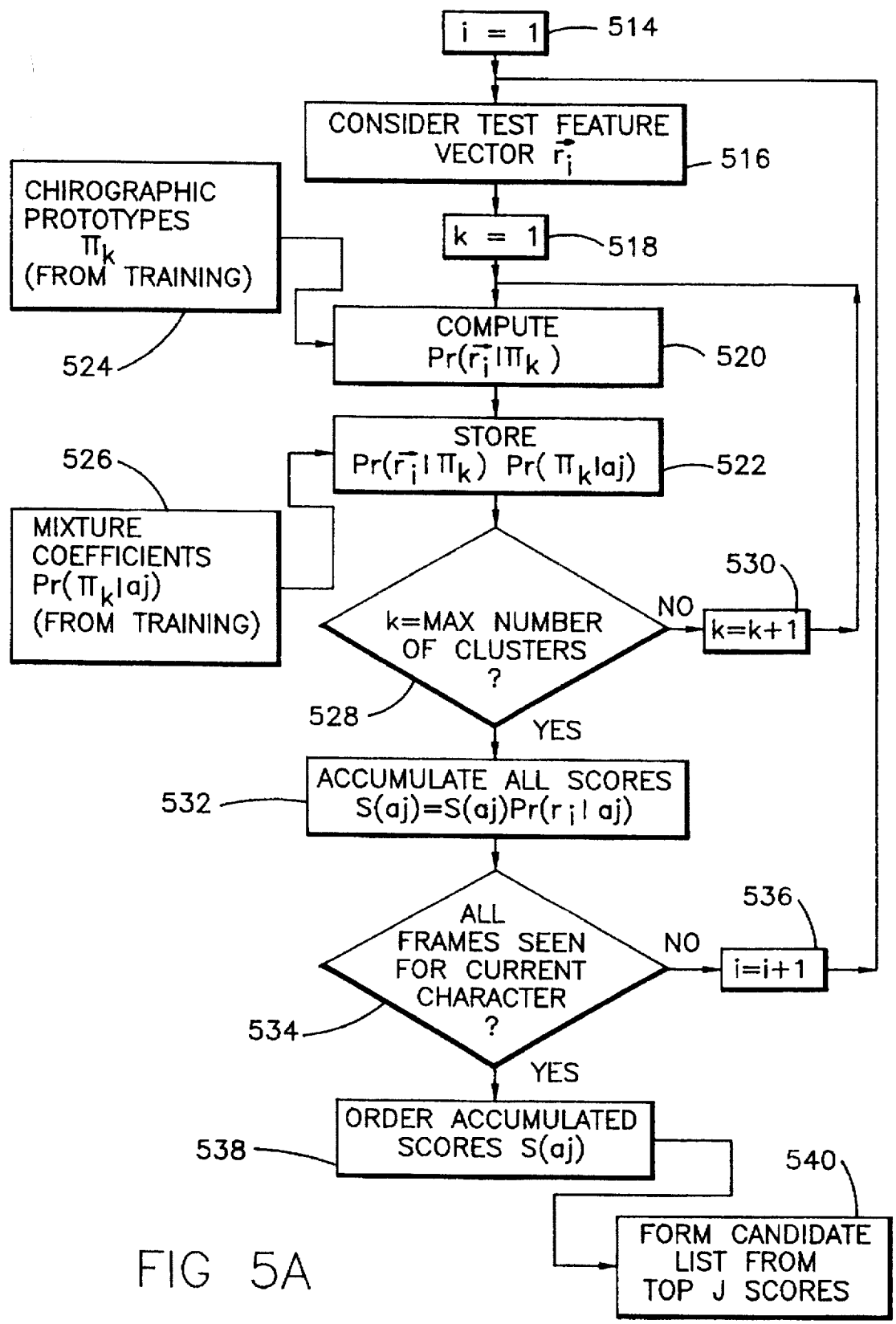
FIG. 5A illustrates the operation of the present invention during a decoding phase for a FAST MATCH.

FIG. 5A, illustrates what can be described as FAST-MATCH decoding of feature vectors by applying chirographic prototypes obtained during training. At block 514 a variable i which is indicative of the current frame (or window center), is initialized to one, and the test feature vector $r_i$ is provided from the front end parameter extraction 302 (FIG. 3) as indicated at block 516. At block 518 a variable k representative of the current prototype distribution is initialized to k=1. The conditional probability of this feature vector given this prototype distribution is computed at block 520 and is provided to block 522.

The prototype construction of the training phase as represented by the chirographic prototype distributions $\Pi_k$ in block 524 and mixture coefficients $P_r(r_i|\Pi_k)$ in block 526 are also provided to block 522 where the combined probability is computed and stored. At decision block 528 a determination is made if k has reached the maximum number of clusters. If not, k is incremented by one as indicated at block 530, and a return is made to block 520 and the just recited process is repeated. If so, the scores just stored are accumulated at block 532 for all characters $S(a_j)$ in the underlying alphabet. At decision block 534 a determination is made if all frames i have been seen for the current character under consideration. If not, i is incremented by 1 at block 536 and a return is made to block 516 and the just recited process is repeated. If so, the accumulated scores are ordered in block 538 and a candidate list of characters $a_j$ is formed from the top J scores. This list can then be used to determine the likelihood or probability of a certain frame representing a certain character.

Figure 5B:
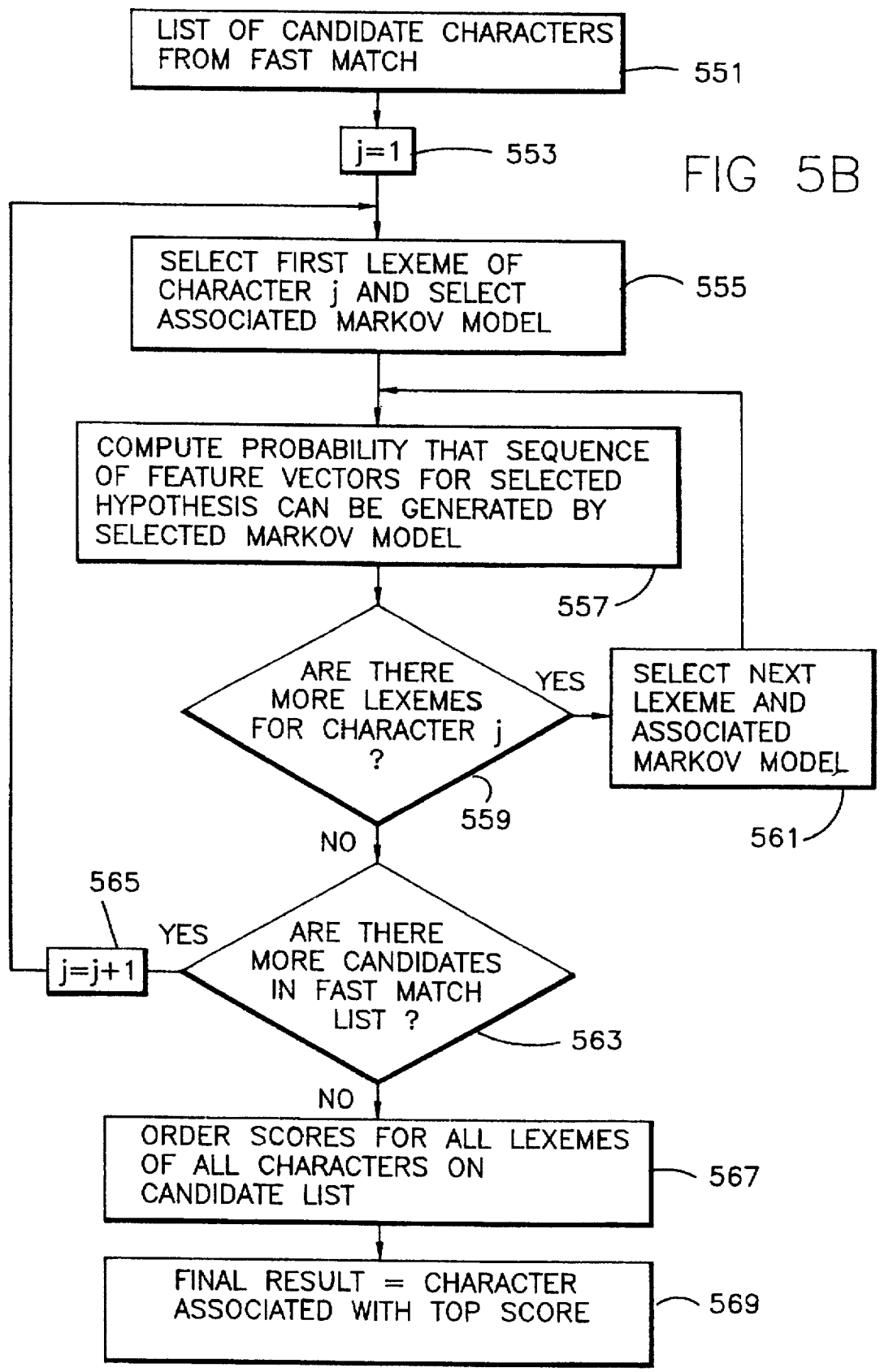
FIG. 5B illustrates the operation of the present invention during a decoding phase for a DETAILED MATCH.

FIG. 5B illustrates what can be described as DETAILED-MATCH decoding of feature vectors using the candidate list provided by the FAST-MATCH to speed up the evaluation. In step 551, the candidate list from block 540 is obtained. At block 553 a variable j which is indicative of the current candidate character on that list is initialized to 1, and the first allograph of character j is provided to the selection block 555. Corresponding to that allograph, the handwriting recognition program 102 selects the first HMM to process. Recall that the HMMs were generated during the training phase such that there is a HMM for each allograph identified.

In step 557, the handwriting recognition program 102 computes and stores the probability that the sequence of feature vectors for the selected character was generated by the selected HMM. In other words, during step 557, the handwriting recognition program 102 calculates the a posterior probability for the character with regard to the selected HMM.

In the preferred embodiment, the handwriting recognition program 102 performs step 557 by using the Viterbi algorithm. The total probability of the observed (test) sequence given a particular model, $\lambda_i$, is approximated by the probability of the most likely path of the sequence through the selected HMM. In practice, this term is the dominant term and yields a reasonable approximation of the total probability. This term can be denoted as $p(X_{test}|\lambda_i)$.

Alternatively, the handwriting recognition program 102 may perform step 557 by using a well-known maximum likelihood algorithm. In this alternate case, no approximation is made.

In step 559, the handwriting recognition program 102 determines whether there are any more HMMs to process for the selected character. If there are more HMMs to process, the handwriting recognition program 102 selects the next HMM (in step 561), and then loops back to step 557. Otherwise, the handwriting recognition software 102 performs step 563.

If, in step 563, more candidates remain on the fast match list, the counter j is incremented in step 565 and the program 102 loops back to step 555. If, on the other hand, all candidates have been processed, the program 102 proceeds to step 568 where the scores resulting from step 557 are ordered. The final result is selected in step 569 and the DETAILED MATCH is complete.

In step 569, the handwriting recognition program 102 would decode the selected character as the character corresponding to the HMM which yielded the highest probability in step 567. Specifically, during step 518, the handwriting recognition program 102 determines that the recognized character is the one that maximizes the a posteriori probabilities calculated in step 557: $\gamma=f(\text{argmax}_i\ p(X_{test}|\lambda_i))$., where f maps the allograph identity, $\lambda_i$, to its associated discrete character.

Figure 6:
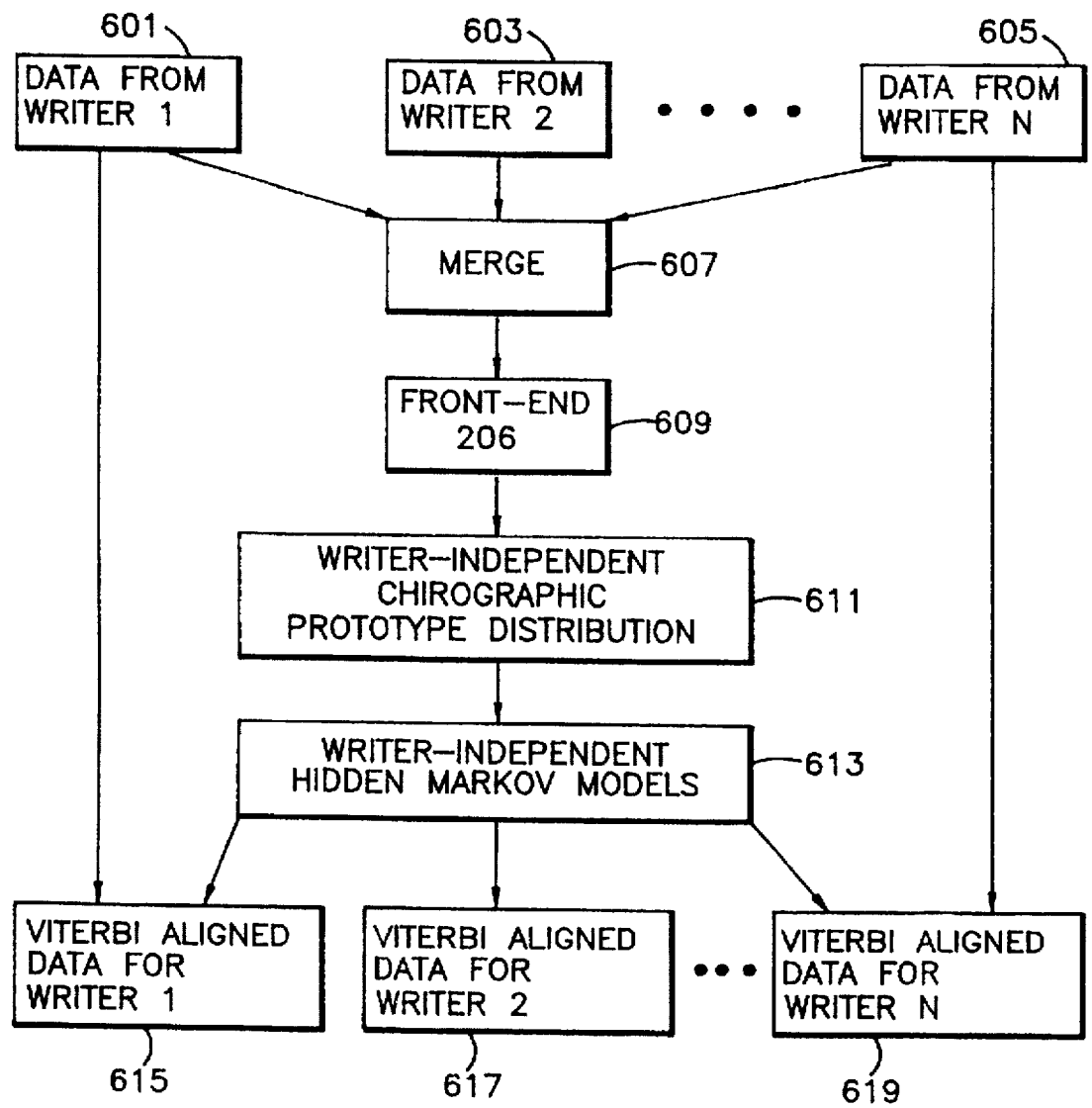
FIG. 6 illustrates the operation of the present invention during an initialization stage.

FIG. 6 illustrates the initialization of data captured from several different writers. To initialize the algorithm, assume that some handwriting has been captured for some adequate number of writers N. A good choice would be greater than or equal to 20. Note that it makes no difference whether this data is obtained at once or over a period of time, as long as it is captured on a similar tablet (e.g. tablet 126 in FIG. 1). Further, assume that all handwriting has been pooled together and appropriately signal processed into a number of sequences of $R_j$ dimensional chirographic feature vectors lying in suitable chirographic space. Under typical conditions, there are two chirographic spaces obtained by projection along the directions of two sets of principal discriminating eigenvectors, and $R_1$ and $R_2$ are about 10. This preliminary step is employed to create initial writer independent Markov character models upon which to base the supervision. Finally Viterbi alignment of the training data against the writer-independent chirographic Markov character models is performed.

The initialization steps are shown in FIG. 6. The data representing writers 1 through some number N is grouped according to writers, as shown in steps 601, 603, and 605. This independent writer data is then collectively merged in step 607. Once the data is merged the front end 206, in step 609, performs the pre-filtering as described in step 300, the parameter extraction as described in step 302, the windowing as described in step 304, and the rotation/projection as described in step 306. The training of feature vectors 308 created by front-end 206 in step 609 are used to derive writer-independent chirographic prototype distributions as shown in step 613 and as described in detail in the above-mentioned U.S. Pat. No. 5,343,637. Next, writer independent HMMs (HMM's) are created as shown in step 613 and described in the background of the present invention. Finally, the data is sorted by independent writer and Viterbi aligned for each writer, as shown in steps 615, 617, and 619.

Figure 7:
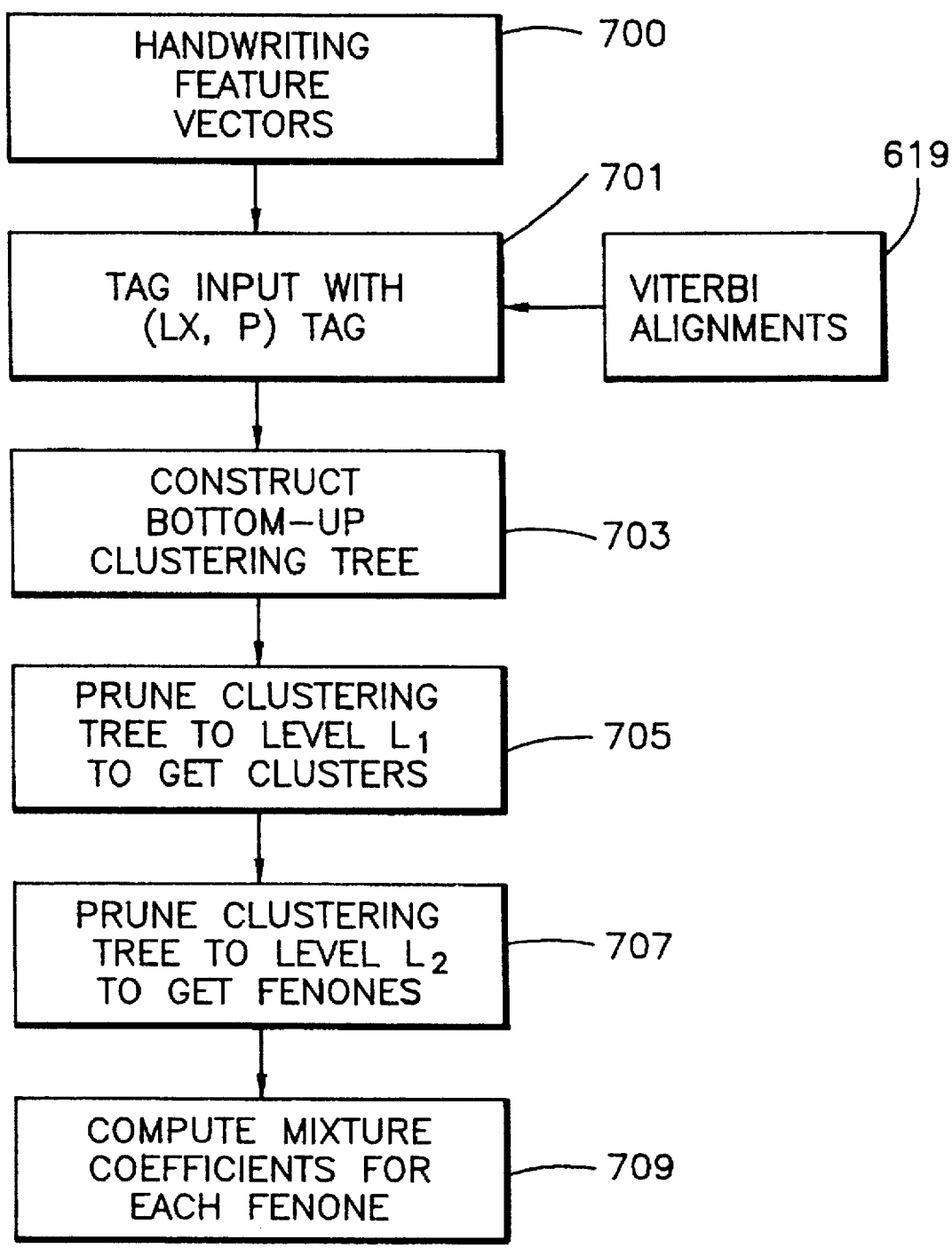
FIG. 7 illustrates the operation of the present invention utilizing the supervision techniques of the present invention.

FIG. 7 illustrates the use of supervision. Before explaining the details of supervision it is helpful to understand the inherent advantages of employing supervision techniques. In order to obtain that understanding, it is helpful to review unsupervised techniques of handwriting recognition. In particular, it is useful to compare to K-means clustering. In that case, the system analyzes some training data, related but distinct from the data to be ultimately recognized and isolates various character models from that data to maximize some objective function. In the above-mentioned U.S. Pat. No. 5,343,637 this objective function has to do with the dispersion of the data around certain cluster centroids (i.e. some regions of the vector space are more populated than others by the feature vectors, resulting in clusters, also called prototypes). These clusters, as described in the above referenced patent application, are determined from an iterative bottom-up procedure called K-means clustering, which is initialized randomly. No additional knowledge about the data is used in the handwriting recognition algorithm. In essence, this is comparable to the unsupervised learning approach of Neural Networks. No "monitoring" (i.e. supervision) takes place: once the K-means algorithm has converged, the prototypes are saved and that is the end of the process. Thus, the success of the training phase cannot be measured, except during recognition.

The present invention takes this process further. After the above character models have been initialized, the handwriting recognition program 102 uses them to perform a Viterbi alignment of the training data against these initial models. The alignment provides information as to which portion of the handwriting corresponds to which character model. Because this is a statistical algorithm, it is guaranteed to produce the best possible alignment given the initial character models. This information allows the handwriting recognition program 102 to re-do the bottom-up clustering starting from reasonable initial clusters (those resulting from the above Viterbi alignment) rather than random values. This process is referred to as "supervised" clustering because it uses additional information coming from the Viterbi alignment to monitor the training phase.

It is noted that the use of supervision may be employed with the FAST MATCH, with the DETAILED MATCH, or with both. In a presently preferred embodiment of the invention both are supervised.

FIG. 7 illustrates the steps of the supervision process of the present invention. First, input handwriting feature vectors from multi-writer handwriting data are provided in step 700. Each vector received by the handwriting recognition program 102 is tagged in step 701, using the Viterbi alignments from step 615, 617 and 619 (the content and significance of this tag is explained below). A binary clustering tree is then created in step 703 from the tagged data of step 701. This tree-based hierarchy is particularly useful for tying purposes when the training data is sparse, because all relevant inter-relationships are exposed between potential clusters. The Tree is then pruned according to some preselected criterion in step 705, again using the tagged data of step 701. Only a desired number of leaves, $L_1$ are retained on the tree, thus forming the final clusters (leaves are discussed below in a detailed description of tree pruning in FIG. 9). These clusters are naturally supervised since they are tied through the clustering tree. Moreover, this tree-based approach is intrinsically amenable to a fast implementation.

The tree is then pruned further (Step 707) to retain a number of leaves $L_2<L_1$, thus forming the final elementary handwriting units which comprise the writer-independent label alphabet sought. The term "elementary handwriting unit" refers, in this context, to a portion of a character. Note that this label alphabet is explicitly related to the chirographic manifestations of each allograph through the tree structure used in its derivation. Since each HMM is expressed as a sequence of elementary handwriting units, this achieves the objective of associating each HMM to the manifestations of the associated allograph in chirographic space.

In step 709, the relationship between elementary handwriting units and clusters is captured through a computation of mixture coefficients. This step is described in detail in FIG. 10.

This supervised aspect of the invention is what yields the particular advantages over K-means type of clustering and thus allows for automatic handwriting recognition using a chirographic label alphabet that is independent of an individual writer. However, the clustering and pruning criteria gives added flexibility since predetermined criteria can be used. Since added accuracy may increase cost, the added flexibility allows the user of the present invention to control cost by controlling monitoring criteria.

Figure 8:
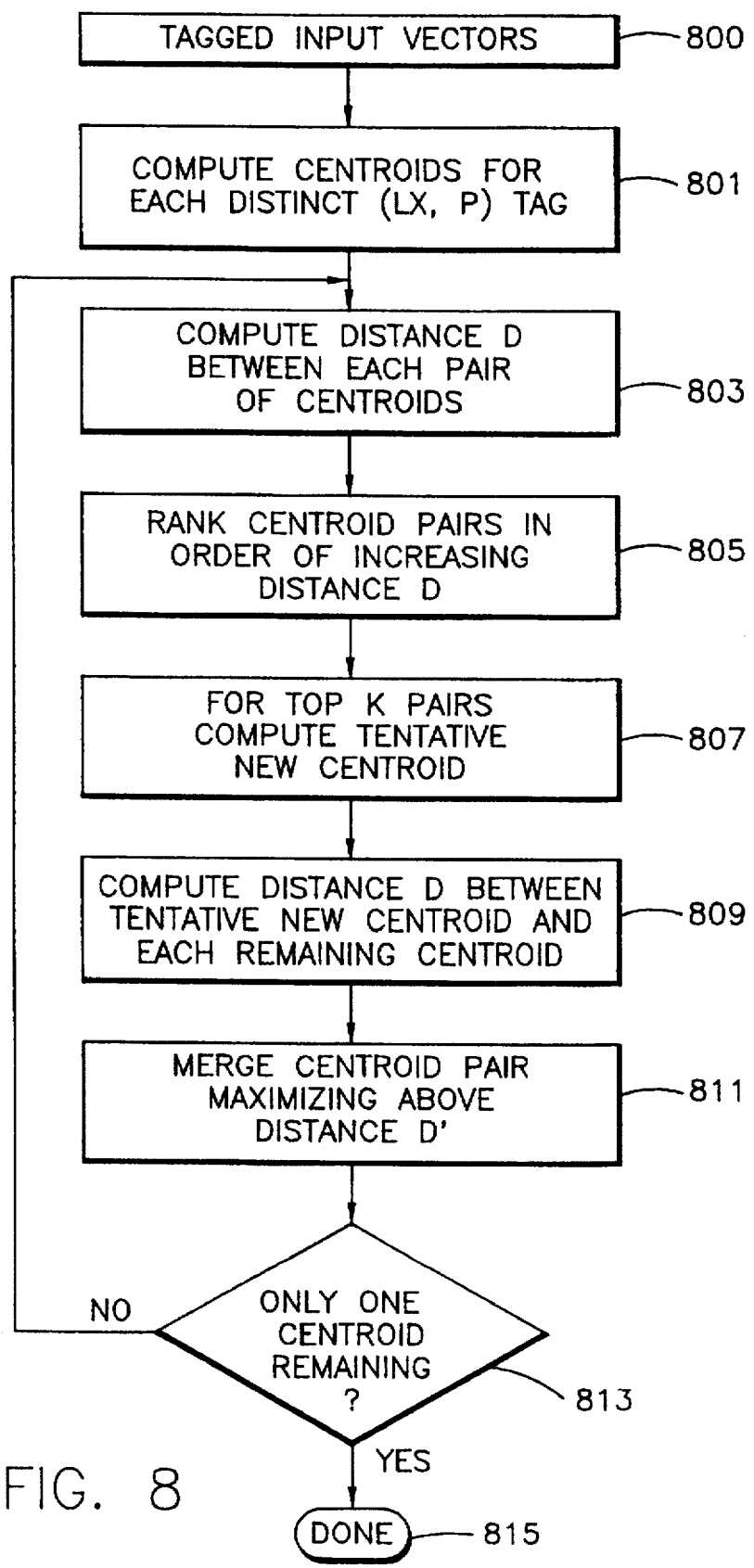
FIG. 8 illustrates the tree construction of the present invention.

FIG. 8 illustrates Tree construction. Tree construction is comprised of the following steps.

1. In step 800, and on the basis of the available statistical alignment, for example Viterbi alignment, for the pooled handwriting data, the handwriting recognition program 102 tags each vector in the current chirographic space with an index which unambiguously identifies the following: (a) the associated allograph identity $L_x$ from the alphabet $A_{lx}$ containing all the allographs for all the characters, and (b) the position P of all the elementary units with the baseform $L_x$ against which the parameter eigenvector was aligned. Each distinct ($L_x$, P) is called a Leaf. This is shown in step 800. The alphabet $A_{lx}$ is composed of allographs, which are spanned by hidden Markov character models. These models include a sequence of elementary units, for example two-node, three-arc machines called fenonic Markov models.

2. In step 801, handwriting recognition program 102 computes centroids for each distinct Leaf ($L_x$, P) using the tagged feature vectors provided as input in step 800.

3. In step 803, handwriting recognition program 102 computes the distance D between each pair of centroids.

4. In step 805, handwriting recognition program 102 ranks the centroid pairs in order of increasing distance D.

5. In step 807, handwriting recognition program 102 computes a tentative new centroid for the top k (clustering) pairs.

6. In step 809, handwriting recognition program 102 computes the distance D' between tentative new centroids and each remaining centroid.

7. In step 811, handwriting recognition program 102 merges the centroid pair which maximizes the distance D'.

8. In step 813, a decision branch, handwriting recognition program 102 checks to see if only one centroid is remaining.

9. If more than one centroid is remaining, then steps 803–813 are repeated.

10. If only one centroid is remaining, then the tree construction is complete.

Figure 9:
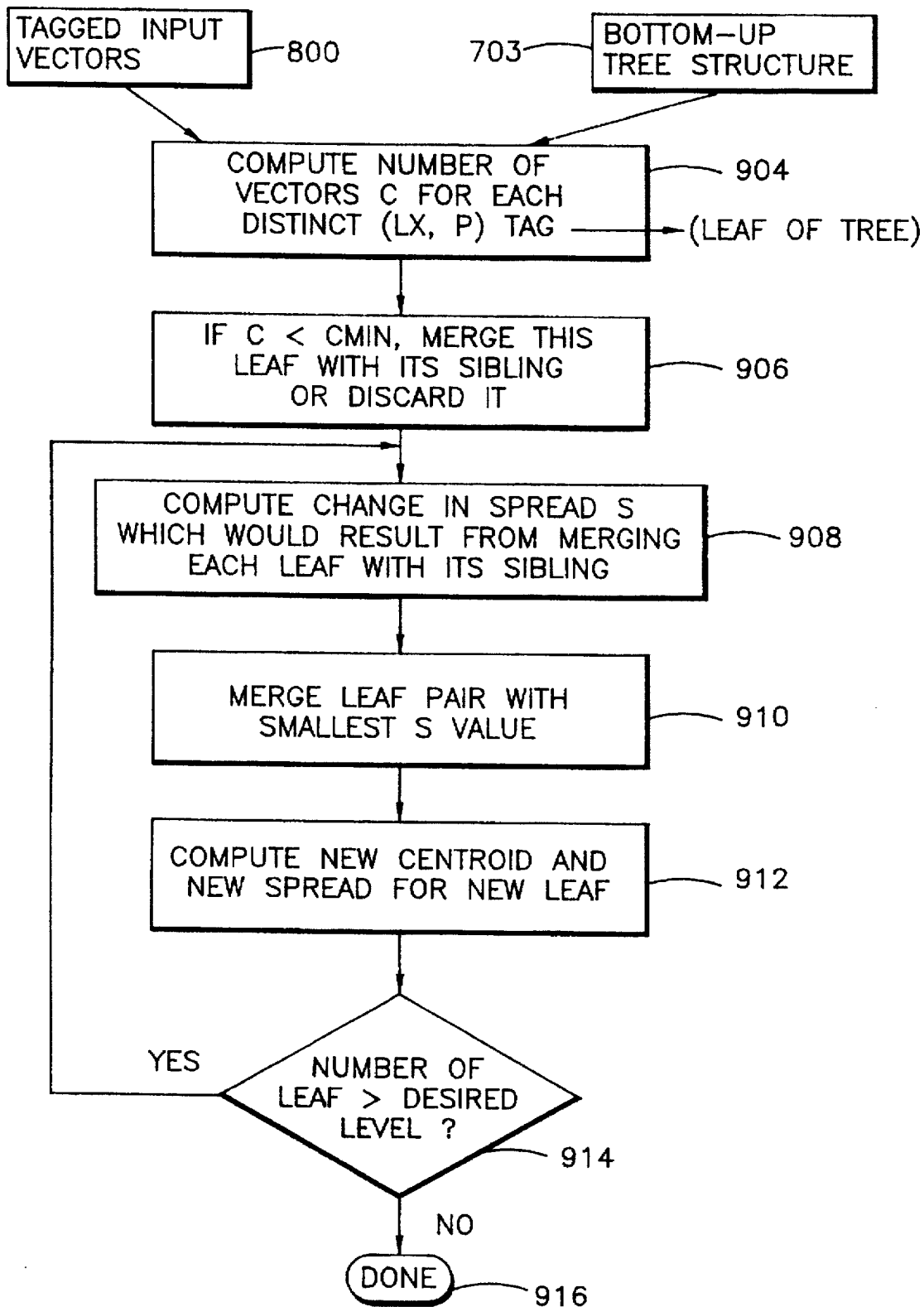
FIG. 9 illustrates the tree pruning method of the present invention.

FIG. 9 illustrates the Tree pruning steps. The purpose of tree pruning is to reduce the number of Leaves on the Tree according to some appropriate criterion, using the data obtained from multi-writer handwriting data. After pruning only a desired number of leaves is retained, thus forming the final clusters. Tree pruning is comprised of the following steps.

1. Using the feature vectors (provided as input as shown in step 800) as well as the bottom-up tree structure (as shown in step 703), handwriting recognition program 102 computes the number of vectors C for each distinct ($L_x$, P) Tag (i.e. each distinct Leaf). This is shown in step 904.

2. In step 906, the handwriting recognition program 102 determines if $C<C_{min}$ (the value of the vectors C is compared to a predetermined minimum threshold value for C). If it is, then the Leaf is either merged with its sibling or discarded. A suitable choice for $C_{min}$ is 10.

Figure 12:
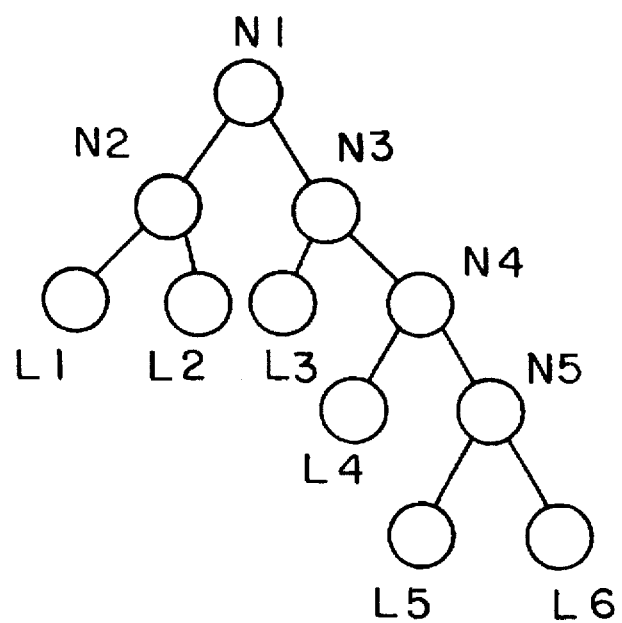
FIG. 12 illustrates an exemplary clustering tree.

In this regard, reference is made to FIG. 12 which illustrates an exemplary tree comprised of a plurality of nodes 1–5, leaves 1–6, and subtrees, such as the subtree defined by nodes 4 and 5 and leaves 4–6. In the example of FIG. 12, the sibling of leaf 1 happens also to be a leaf (leaf 2). However, the sibling of leaf 3 is not a leaf but is instead the subtree defined by nodes 4 and 5 and leaves 4–6.

With respect to merging, if the sibling of a leaf is also a leaf, then the two leaves are merged into one. If instead the sibling of a leaf is a subtree, then C is compared to $C_{sibling}$, the sum of all the counts in that subtree. If $C<Th*C_{sibling}$, where Th is a predetermined threshold, the leaf is discarded. Otherwise, no action is taken for that particular leaf.

3. In step 908, the handwriting recognition program 102 computes the change in spread ΔS which would result from merging each Leaf with its sibling. The spread (S) at a leaf is computed as C*variance, where the variance equals:

$$\sum_i x_i^2 - \left(\sum_i x_i\right)^2$$

where $x_i$ are the vectors present at that leaf. Thus, $$S = C\left[\sum_i x_i^2 - \left(\sum_i x_i\right)^2\right],$$

and $\Delta S = S_{leaf1+leaf2merged} - S_{leaf1alone} - S_{leaf2alone}$.

4. In step 910, the handwriting recognition program 102 merges the leaf pair with the smallest $\Delta S$ value.

5. In step 912, the handwriting recognition program 102 computes a new centroid and a new spread for the new leaf just completed by merging the leaf pairs.

6. In step 914, a decision branch, the handwriting recognition program 102 determines if the number of Leaves is greater than some predetermined desired number of Leaves and then branches accordingly. A suitable value for the threshold number of $L_1$ is 750, at the cluster level, and for $L_2$ a suitable value is 100, at the elementary handwriting unit level. (See FIG. 7).

7. If the number of Leaves is greater than the desired level than steps 908–914 are repeated.

8. If the number of Leaves is not greater than the desired level then tree pruning is completed in step 916.

Figure 10:
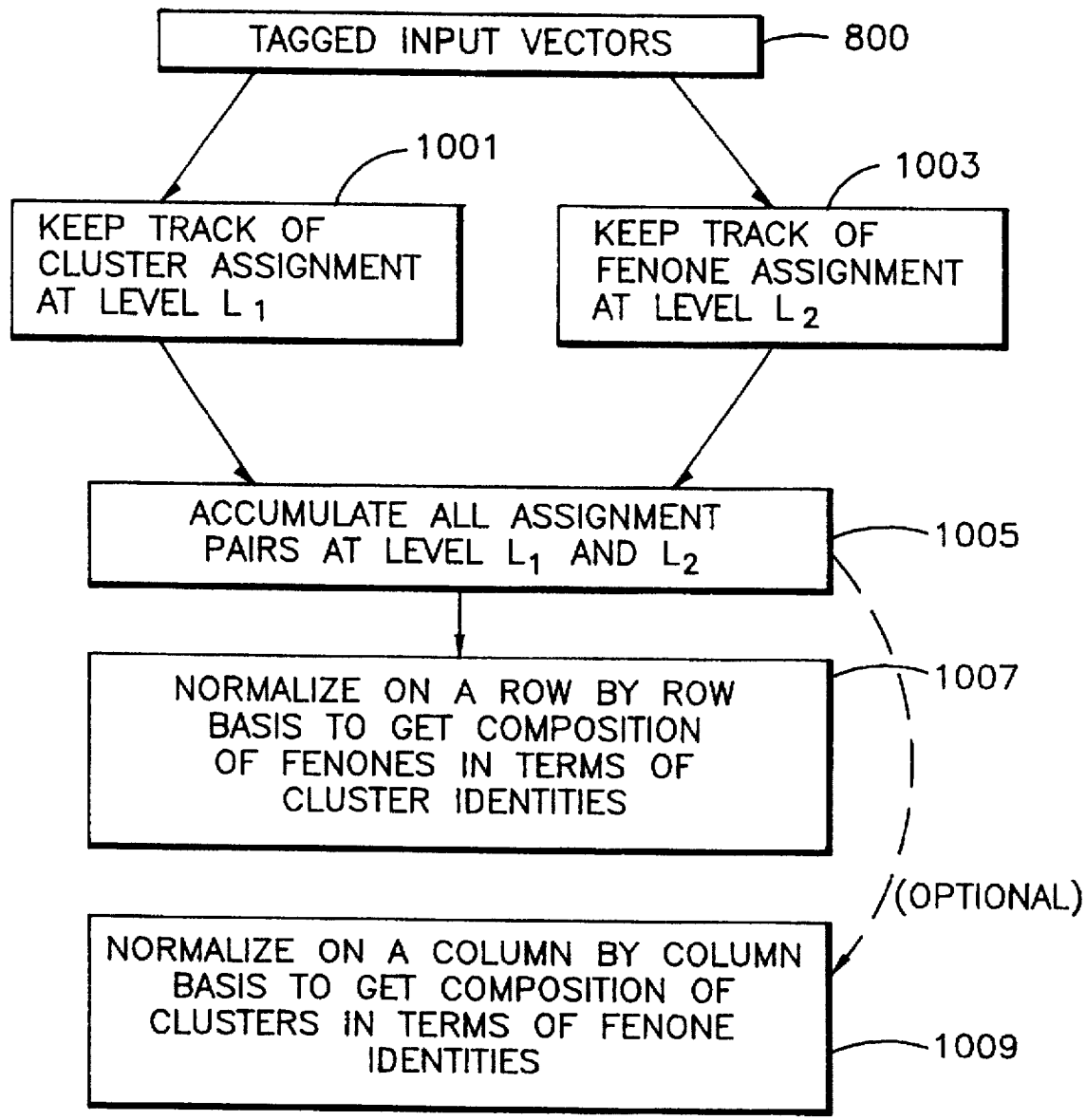
FIG. 10 illustrates the method of mixing coefficients in the present invention.

FIG. 10 illustrates the computation of the mixture of coefficients. The computation of the mixture of coefficients is comprised of the following steps.

1. Using the tagged feature vectors, as obtained in step 800, the handwriting recognition program 102:
   A. maintains a record of (keeps track of) cluster assignments at level $L_1$, as shown in step 1001, and
   B. maintains a record of elementary handwriting unit assignments at level $L_2$, as shown in step 1003.

2. Next the handwriting recognition program 102 accumulates all assignment pairs at level $L_1$, and $L_2$, as shown in step 1005.

3. Next the handwriting recognition program 102 normalizes on a row-by-row basis to obtain a composition of elementary handwriting units in terms of cluster identities, as shown in step 1007.

4. As an alternative to step 1007, the normalization may be performed on a column-by-column basis to obtain a composition of clusters in terms of elementary handwriting unit identities.

While the invention has been particularly shown and described with reference to preferred embodiments thereof, it will be understood by those skilled in the art that various changes in form and details may be made therein without departing from the spirit and scope of the invention.

What is claimed is:

1. A method for operating a handwriting recognition system having a programmed digital data processor, comprising the data processor executed steps of:

generating a sequence of feature vectors in response to a two-dimensional trace associated with the input handwriting;

projecting the sequence of feature vectors onto a higher dimensional feature space that represents sub-character sections of the input handwriting;

performing a fast match of the sequence of feature vectors by generating a list of probable candidate characters using single-state, hidden Markov models (HMMs) having output probability distributions obtained from writer-independent higher dimensional feature space prototype distributions; and performing a detailed match on the list of probable candidate characters using multi-state, writer independent HMMs to identify a most probable character sequence that the input handwriting represents; wherein at least one of the steps of performing a fast match and performing a detailed match operate in accordance with a supervision process.

2. A method as set forth in claim 1 and further including a preliminary step of:

for each character of interest, representing each allograph in terms of a multi-state HMM, where each allograph represents a different style for writing the character of interest.

3. A method for operating a handwriting recognition system having a programmed digital data processor, comprising the steps of:

generating a sequence of feature vectors in response to a two-dimensional trace associated with the input handwriting;

projecting the sequence of feature vectors onto a higher dimensional feature space that represents sub-character sections of the input handwriting;

performing a fast match of the sequence of feature vectors by generating a list of probable candidate characters sequentially using single-state, hidden Markov models (HMMs) having output probability distributions obtained from writer-independent higher dimensional feature space prototype distributions; and performing a detailed match on the list of probable candidate characters using multi-state, writer independent HMMs to identify a most probable character sequence that the input handwriting represents; and further including the initial steps of:

tagging individual ones of handwriting feature vectors in accordance with a statistical alignment;

constructing a binary clustering tree from the tagged feature vectors;

pruning the binary clustering tree in accordance with a predetermined pruning criteria to retain a first number of leaves $L_1$ for forming clusters;

further pruning the binary clustering tree to retain a second number of leaves L2, wherein $L_2 < L_1$, for forming a plurality of elementary handwriting units representing a writer-independent label alphabet; and establishing a relationship between the elementary handwriting units and clusters by a step of determining mixture coefficients.

4. A method as set forth in claim 3 wherein the step of tagging includes a step of:

in accordance with the statistical alignment, tagging each feature vector in a current higher dimensional feature space with an index which unambiguously identifies the following properties: (a) an associated allograph identity $L_x$ from an alphabet $A_{L_x}$ that contains all the allographs for all the characters, and (b) the position P of a state within the HMM associated with $L_x$ against which the feature vector was aligned, wherein each distinct ($L_x$, P) represents a leaf of the binary clustering tree; and wherein the step of constructing the binary clustering tree includes the steps of, (a) computing centroids for each distinct Leaf ($L_x$, P) using the tagged feature vectors;

(b) computing a distance D between each pair of centroids;

(c) ranking the centroid pairs in order of increasing distance D;

(d) computing a tentative new centroid for the top k (clustering) pairs;

(e) computing a distance D' between tentative new centroids and each remaining centroid;

(f) merging the centroid pair from the top k pairs which maximizes the distance D';

(g) determining if only one centroid is remaining, and if no, then repeating steps (b) through (g); else if only one centroid is remaining, then the step of constructing the binary clustering tree is complete.

5. A method as set forth in claim 4, wherein each of the steps of pruning are accomplished by the steps of:

(a) in accordance with the handwriting feature vectors and the constructed binary clustering tree, computing a number of vectors C for each distinct Leaf (($L_x$, P) Tag);

(b) comparing the value of the vectors C to a predetermined minimum threshold value $C_{min}$ to determine if $C<C_{min}$, and if yes, merging the Leaf with its sibling;

(c) computing a change $\Delta S$ in a spread S which would result from merging each Leaf with its sibling;

(d) merging a Leaf pair having a smallest $\Delta S$ value to form a new Leaf;

(e) computing a new centroid and a new spread for the new Leaf;

(f) determining if the number of Leaves is greater than some predetermined number of Leaves;

(g) if the number of Leaves is greater than the predetermined number, then repeating steps (c) through (g), else if the number of Leaves is not greater than the predetermined number, then the step of tree pruning is complete.

6. A method as set forth in claim 5, wherein for the first step of pruning the predetermined number of Leaves ($L_1$) is equal to approximately 750, and wherein for the second step of pruning the predetermined number of Leaves ($L_2$) is equal to approximately 100.

7. A method as set forth in claim 3 wherein the step of determining mixture coefficients includes the steps of:

in accordance with the tagged feature vectors, maintaining a record of cluster assignments at level $L_1$, and maintaining a record of elementary handwriting unit assignments at level $L_2$;

accumulating all assignment pairs at level $L_1$ and at level $L_2$; and normalizing on a row-by-row basis to obtain a composition of elementary handwriting units in terms of cluster identities.

8. A method as set forth in claim 3 wherein the step of determining mixture coefficients includes the steps of:

in accordance with the tagged feature vectors, maintaining a record of cluster assignments at level $L_1$, and maintaining a record of elementary handwriting unit assignments at level $L_2$;

accumulating all assignment pairs at level $L_1$ and at level $L_2$; and normalizing on a column-by-column basis to obtain a composition of clusters in terms of elementary handwriting unit identities.

9. A handwriting recognition system that includes a programmed digital data processor, said digital data processor being programmed to implement a handwriting recognition system that is comprised of:

means for generating a sequence of feature vectors in response to input handwriting received from a handwriting transducer means;

means for projecting the sequence of feature vectors onto a higher dimensional feature space that represents sub-character sections of the input handwriting;

means for performing a fast match of the sequence of feature vectors, including means for generating list of probable candidate characters using single-state, hidden Markov models (HMMs) having output probability distributions obtained from writer-independent higher dimensional feature space prototype distributions; and means for performing a detailed match on the list of probable candidate characters using multi-state, writer independent HMMs, said detailed match performing means having an output for expressing a most probable character sequence that the input handwriting represents; wherein at least one of said means for performing a fast match and said means for performing a detailed match operate in accordance with a supervision process.

10. A handwriting recognition system as set forth in claim 9 and further comprising:

means for representing each character of interest as an allograph in terms of a multi-state HMM, where each allograph represents a different style for writing the character of interest.

11. A handwriting recognition system that includes a programmed digital data processor, said digital data processor being programmed to implement a handwriting recognition system that is comprised of:

means for generating a sequence of feature vectors in response to input handwriting received from a handwriting transducer means;

means for projecting the sequence of feature vectors onto a higher dimensional feature space that represents sub-character sections of the input handwriting;

means for performing a fast match of the sequence of feature vectors, including means for generating a list of probable candidate characters sequentially using single-state, hidden Markov models (HMMs) having output probability distributions obtained from writer-independent higher dimensional feature space prototype distributions; and means for performing a detailed match on the list of probable candidate characters using multi-state, writer independent HMMs, said detailed match performing means having an output for expressing a most probable character sequence that the input handwriting represents; and further comprising:

means for tagging individual ones of handwriting feature vectors in accordance with statistical alignments;

means for constructing a binary clustering tree from the tagged feature vectors;

means for pruning the binary clustering tree in accordance with a predetermined pruning criteria to retain a first number of leaves $L_1$ for forming clusters;

means for further pruning the binary clustering tree to retain a second number of leaves L2, wherein $L_2<L_1$, for forming a plurality of elementary handwriting units representing a writer-independent label alphabet; and means for establishing a relationship between the elementary handwriting units and clusters in accordance with determined mixture coefficients.

12. A method for operating a handwriting recognition system having a programmed digital data processor, comprising the data processor executed steps of:

obtaining training data from a plurality of writers;

extracting parameter vectors from the obtained training data;

determining from the parameter vectors a plurality of allographs, where each allograph represents a different style for writing a character of interest;

generating an initial hidden Markov model (HMM) for each allograph;

extracting feature vectors from the obtained training data;

projecting the feature vectors onto a higher dimensional feature space that represents sub-character sections of the input handwriting;

aligning each feature vector against an appropriate one of the HMMs;

forming a cluster comprised of all feature vectors that are aligned against the same allograph;

determining a statistical description of each cluster;

forming a clustering tree in accordance with the statistical descriptions;

forming a set of prototypes from the clustering tree;

forming a set of elementary handwriting units from the clustering tree;

generating a set of HMMs for each allograph based on the formed set of prototypes and the formed set of elementary handwriting units;

performing a fast match of the sequence of feature vectors by generating a list of probable candidate characters sequentially using single-state, hidden Markov models (HMMs) having output probability distributions obtained from writer-independent higher dimensional feature space prototype distributions; and performing a detailed match on the list of probable candidate characters using multi-state, writer independent HMMs to identify a most probable character sequence that the input handwriting represents.

13. A method as set forth in claim 12 wherein the step of generating an initial HMM for each allograph includes a step of, for each character of interest, representing each allograph in terms of a multi-state HMM, where each allograph represents a different style for writing the character of interest.

14. A method as set forth in claim 12 wherein the step of forming a clustering tree includes the steps of:

tagging individual ones of handwriting feature vectors in accordance with a statistical alignment;

constructing a binary clustering tree from the tagged feature vectors;

pruning the binary clustering tree in accordance with a predetermined pruning criteria to retain a first number of leaves $L_1$ for forming clusters;

further pruning the binary clustering tree to retain a second number of leaves L2, wherein $L_2<L_1$, for forming a plurality of elementary handwriting units representing a writer-independent label alphabet; and establishing a relationship between the elementary handwriting units and clusters by a step of determining mixture coefficients.

15. A method as set forth in claim 14 wherein the step of tagging includes a step of:

in accordance with the statistical alignment, tagging each feature vector in a current higher dimensional feature space with an index which unambiguously identifies the following properties: (a) an associated allograph identity $L_x$ from an alphabet $A_{L_x}$ that contains all the allographs for all the characters, and (b) the position P of a state within the HMM associated with $L_x$ against which the feature vector was aligned, wherein each distinct ($L_x$, P)

represents a leaf of the binary clustering tree; and wherein the step of constructing the binary clustering tree includes the steps of, (a) computing centroids for each distinct Leaf ($L_x$, P) using the tagged feature vectors;

(b) computing a distance D between each pair of centroids;

(c) ranking the centroid pairs in order of increasing distance D;

(d) computing a tentative new centroid for the top k (clustering) pairs;

(e) computing a distance D' between tentative new centroids and each remaining centroid;

(f) merging the centroid pair from the top k pairs which maximizes the distance D';

(g) determining if only one centroid is remaining, and if no, then repeating steps (b) through (g); else if only one centroid is remaining, then the step of constructing the binary clustering tree is complete.

16. A method as set forth in claim 15, wherein each of the steps of pruning are accomplished by the steps of:

(a) in accordance with the handwriting feature vectors and the constructed binary clustering tree, computing a number of vectors C for each distinct Leaf (($L_x$, P) Tag);

(b) comparing the value of the vectors C to a predetermined minimum threshold value $C_{min}$ to determine if $C<C_{min}$, and if yes, merging the Leaf with its sibling;

(c) computing a change ΔS in a spread S which would result from merging each Leaf with its sibling;

(d) merging a Leaf pair having a smallest ΔS value to form a new Leaf;

(e) computing a new centroid and a new spread for the new Leaf;

(f) determining if the number of Leaves is greater than some predetermined number of Leaves;

(g) if the number of Leaves is greater than the predetermined number, then repeating steps (c) through (g), else if the number of Leaves is not greater than the predetermined number, then the step of tree pruning is complete.

17. A method as set forth in claim 16, wherein for the first step of pruning the predetermined number of Leaves ($L_1$) is equal to approximately 750, and wherein for the second step of pruning the predetermined number of Leaves ($L_2$) is equal to approximately 100.

18. A method as set forth in claim 14 wherein the step of determining mixture coefficients includes the steps of:

in accordance with the tagged feature vectors, maintaining a record of cluster assignments at level $L_1$, and maintaining a record of elementary handwriting unit assignments at level $L_2$;

accumulating all assignment pairs at level $L_1$ and at level $L_2$; and normalizing on a row-by-row basis to obtain a composition of elementary handwriting units in terms of cluster identities.

19. A method as set forth in claim 14 wherein the step of determining mixture coefficients includes the steps of:

in accordance with the tagged feature vectors, maintaining a record of cluster assignments at level $L_1$, and maintaining a record of elementary handwriting unit assignments at level $L_2$;

accumulating all assignment pairs at level $L_1$ and at level $L_2$; and normalizing on a column-by-column basis to obtain a composition of clusters in terms of elementary handwriting unit identities.

20. A method as set forth in claim 12, wherein the step of obtaining training data includes the steps of pre-filtering data received from a digitizing tablet means, in response to a movement of a pen means, to normalize for a speed of the pen means when forming a stroke; and interpolating the pre-filtered data, as necessary, to locate equally spaced points.

21. A method as set forth in claim 20 wherein the step of extracting parameter vectors includes the steps of, for each point $P_n$ of coordinate $(x_n, y_n)$ in the training data, forming a P-dimensional vector $P_n$ of feature elements representative of a local pen means trajectory around $P_n$; and for each point $P_n$ of coordinates $(x_n, y_n)$ in the training data, forming a P'-dimensional vector $P_n$ of feature elements representative of a global pen means trajectory up to $P_n$.

22. A method as set forth in claim 21 wherein feature elements of the P-dimensional vector $P_n$ are given by: (i) horizontal and vertical incremental changes; (ii) the sine and cosine of the angle of the tangent to the pen means trajectory at $P_n$; and (iii) incremental changes in the sine and cosine of the angle of the tangent, and wherein feature elements of the P'-dimensional vector $P_n$ are given by: (i) the height from a baseline $y_n$, (ii) the width from the beginning of a stroke $x_n - x_n$, where xi is the first coordinate of a current stroke, and (iii) an inter-stroke distance if a current character is comprised of more than one stroke.

23. A method as set forth in claim 20 and further including a step forming a window by the steps of, for each stroke in the training data, determining a subset of the points $P_n$ in that stroke $Q_i$, with each $Q_i$ being approximately equally spaced apart; at each location $Q_i$, constructing a Q-dimensional spliced vector by concatenating together the H vectors $P_n$ preceding $Q_i$, the vector $q_i$ corresponding to $Q_i$, and the H vectors $P_n$ following $Q_i$; and constructing a Q'-dimensional spliced vector by concatenating together the H' vectors $P'_n$ preceding $Q_i$, the vector $q'_i$ corresponding to $Q_i$, and the H' vectors $P_n$ following $Q_i$.

* * * * *

UNITED STATES PATENT AND TRADEMARK OFFICE
CERTIFICATE OF CORRECTION

PATENT NO. : 5,644,652
DATED : July 1, 1997
INVENTOR(S) : Bellegarda et al.

It is certified that error appears in the above-indentified patent and that said Letters Patent is hereby corrected as shown below:

IN THE CLAIMS:

In Column 20, line 9, after "stroke" should read $--X_n-X_i--$.
(Claim 22)

Signed and Sealed this

Ninth Day of September, 1997

Attest:

BRUCE LEHMAN

Attesting Officer

Commissioner of Patents and Trademarks